United States Patent [19]

Reed

[11] 4,036,938
[45] July 19, 1977

[54] PRODUCTION OF HIGH PURITY HYDROGEN FLUORIDE FROM SILICON TETRAFLUORIDE

[76] Inventor: Richard S. Reed, 715 White Bridge Road, Millington, N.J. 07946

[21] Appl. No.: 730,654

[22] Filed: Oct. 7, 1976

Related U.S. Application Data

[63] Continuation-in-part of Ser. No. 608,652, Aug. 28, 1975, abandoned, which is a continuation-in-part of Ser. No. 290,121, Sept. 16, 1972, abandoned.

[51] Int. Cl.² .................... C01B 7/22; C01B 33/12
[52] U.S. Cl. .................... 423/483; 423/337; 423/488; 423/336
[58] Field of Search ........... 423/230, 231, 336, 337, 423/472, 483, 484, 488

[56] References Cited

U.S. PATENT DOCUMENTS

| 2,631,083 | 3/1953 | Engelson et al. | 423/336 |
|---|---|---|---|
| 3,053,627 | 11/1962 | Flemmert | 423/336 |
| 3,110,562 | 11/1963 | Hinkle | 423/337 |
| 3,203,759 | 8/1965 | Flemmert | 423/337 |
| 3,645,684 | 2/1972 | De Cuir | 423/336 |

*Primary Examiner*—O. R. Vertiz
*Assistant Examiner*—Brian E. Hearn
*Attorney, Agent, or Firm*—George E. Kersey

[57] ABSTRACT

Method and apparatus for the production of high purity hydrogen fluoride by the flame hydrolysis of silicon tetrafluoride and the deliberate cooling of the silicon dioxide and hydrogen fluoride reaction products without appreciable dilution to promote agglomeration of the silicon dioxide and permit separation of the hydrogen fluoride with substantially no contamination.

13 Claims, 4 Drawing Figures

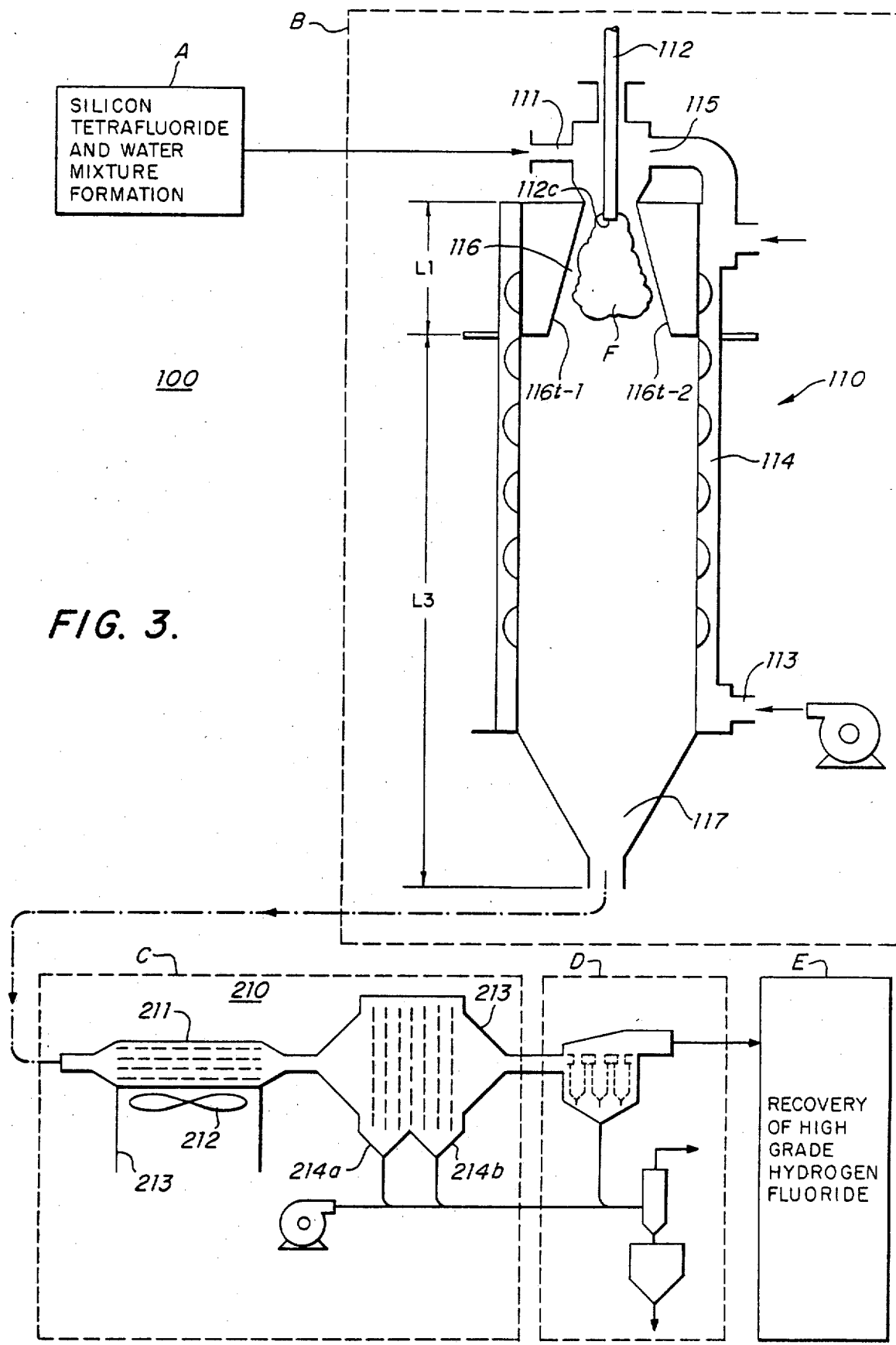

PRODUCTION OF HIGH PURITY HYDROGEN FLUORIDE FROM SILICON TETRAFLUORIDE

BACKGROUND

This application is a continuation-in-part of Ser. No. 608,652 filed Aug. 28, 1975, which is in turn a continuation-in-part of Ser. No. 290,121, filed Sept. 16, 1972.

The invention relates to the production of hydrogen fluoride and more particularly to the production of commercial grade hydrogen fluoride from by-product materials.

There are several techniques for producing hydrogen fluoride. Unfortunately, the resulting product is either of low quality, or the method of production is costly and complex. In the typical process for producing hydrogen fluoride, calcium fluoride, such as fluorspar, is reacted with sulfuric acid. Even when the impurity level of the calcium fluoride is low, there is considerable loss of hydrogen fluoride by reaction with the impurities and the product is well below "acid grade" level.

On the other hand, the attempts have been made to realize acid grade hydrogen fluoride from low grade starting materials have not been commercially successful.

For example, Oosta L. Flemmert in U.S. Pat. No. 3,087,787 proposed a four stage process in which hydrogen fluoride is produced from low grade starting materials by (1) initially converting them to silicon tetrafluoride and hydrogen fluoride, (2) reacting the conversion products with vapor to realize silicon dioxide and hydrogen fluoride, along with unreacted silicon tetrafluoride, (3) converting the hydrogen fluoride and unreacted silicon tetrafluoride to sodium bifluroide and sodium fluorsilicate and (4) decomposing the sodium bifluoride to liberate the desired hydrogen fluoride.

It is evident that the Flemmert process of U.S. Pat. 3,087,787 is costly and complex. Yet it is said to be more advantageous and less costly than the process of Engelson et al which requires that relatively pure calcium fluoride be prepared from impure starting materials in accordance with U.S. Pat. No. 2,631,083. In the Engelson et al patent, low grade starting materials are reacted with hydrofluoric acid in aqueous solution. The resulting fluosilicic acid is vaporized and reacted with water vapor, resulting in the formation of hydrogen fluoride and silicon dioxide. The hydrogen fluoride is next used for leaching out silicon dioxide from the calcium fluoride in aqueous solution. The calcium fluoride thus purified can then be used in a reaction with sulfuric acid to produce high grade hydrogen fluoride.

It is apparent that the intermediate hydrogen fluoride product produced in both Flemmert U.S. Pat. No. 3,087,787 and Engelson U.S. Pat. No. 2,631,083 is not suitable of itself because it is of insufficient purity, as a result of being excessively contaminated by unreacted silicon tetrafluoride. As a result, Flemmert requires further reactions which produce sodium bifluoride and its subsequent decomposition before he can obtain fluoride of the desired purity. Similarly in Engelson the excessive contamination of the intermediate hydrogen fluoride permits it to be used only for a recycling reaction, with commercial grade hydrogen fluoride being realized only after recovery of high grade calcium fluoride and a subsequent reaction with sulfuric acid that produces the desired hydrogen fluoride end product.

The reason for the significant impurities of the intermediate hydrogen fluoride product in both Flemmert and Engelson is apparent from another Flemmert U.S. Pat. No. 3,203,759, in which it is noted that if the gaseous reaction product mixture of silicon dioxide and hydrogen fluoride is cooled before separation of the constituents, the reaction is reversed and silicon tetrafluoride is regenerted. Since there is always some incidental cooling before separation takes place, the prior art has required comparatively high conversion temperatures for even comparatively low conversion eficiencies. Thus, Engelson U.S. Pat. No. 2,631,083 achieves a conversion of only 50% when the temperature of separation is about 1100° F (593° C); a conversion of only 80% when the temperature of separation is about 1500° F (816° C); and a conversion of only 90% of theoretical when the temperature of separation is about 2000° F (1093° C). It is apparent that the resulting contamination of the intermediate hydrogen fluoride would prevent its use as an "acid grade" product. This kind of result has been confirmed by the Bureau of Mines of the Department of the Interior in its report RT 7213, dated December 1968.

Accordingly, it is an object of the invention to simplify the conversion of comparatively low grade raw materials to high grade hydrogen fluoride. A related object is to reduce the number of stages and the complexity of the conversion process.

A further object of the invention is to eliminate the need for using low grade hydrogen fluoride as an intermediate in the production of high grade hydrogen fluoride. A related object is to obtain high grade hydrogen fluoride directly, witout intermediate processing steps.

Another object of the invention is to eliminate the need for obtaining high grade hydrogen fluoride by the conversion of comparatively pure calcium fluoride.

A further object of the invention is to eliminate the need for obtaining high grade hydrogen fluoride by the decomposition of high purity sodium bifluoride.

SUMMARY OF THE INVENTION

In accomplishing the foregoing and related objects, the invention profices for the flame hydrolysis of silicon tetrafluoride; followed by deliberate cooling, negligible dilution, and agglomeration of the silicon dioxide reaction product to permit its substantially complete separation from the resulting hydrogen fluoride. By contrast with the prior art, the resulting hydrogen fluoride has a purity in excess of 95%, approaching 99%.

The hydrolysis takes place with moisture in excess of the indicated stochiometric amount at operating temperatures ranging from above 2000° to above about 3000° F (1093° to 1649° C). As the moisture content increases the flame temperature can be correspondingly decreased.

A suitable moisture content ranges from about 2 to about 14 times the stochiometric amount. The actual moisture content can be any value above the stochiometric amount. A desirable moisture range is from about 2 to about 7 times the stochiometric amount. A preferred moisture content is about 3 times the stochiometric amount, for which a suitable temperature is in the range from about 2200° to 2600° F (1204° - 1427° C).

Although the operating temperature can have any value above 2000° F, it is difficult to maintain proper hydrolysis conditions at the lowest end of the range. As a result it is desirable to operate at and above about 2100° F to assure proper hydrolysis conditions. Accordingly a desirable operating temperature is in the range from about 2100 F to at and above about 3000° F. An advantageous operating temperature is in the range from about 2200° F to about 2900° F. The preferred operating temperature is in the range from about 2200° F to about 2600° F.

Following the flame hydrolysis the reaction products are deliberately cooled by at least 500° F (260° C) and the silicon dioxide is agglomerated and separated. Where the hydrolysis temperature is just above 2000° F, the resulting separation can be just above 1500° F, and lower. Separation is above 1500° F and below is desirable for higher temperature hydrolysis as well. The preferred separation temperature is below about 1100° F (593° C) but separation can also be achieved at temperatures as low as 400° F (204° C).

The feed mix for the flame hydrolysis can be obtained from fluosilicic acid, which has been concentrated by distillation or dehydration.

DESCRIPTION OF THE DRAWINGS

Other aspects of the invention will become apparent after considering several illustrative embodiments, taken in conjunction with the drawings in which:

FIG. 3 is a block diagram of alternative apparatus for practicing the invention.

DETAILED DESCRIPTION

Figure 1:
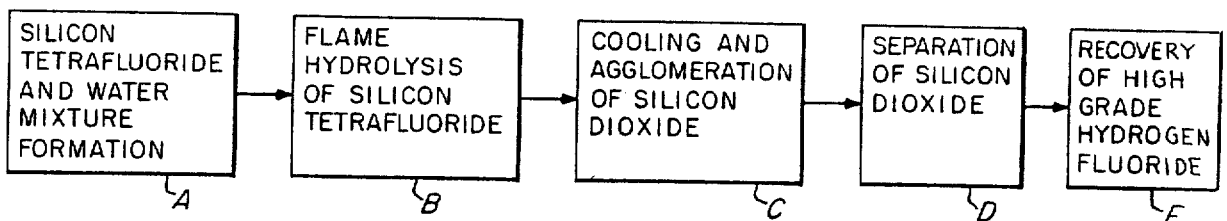
FIG. 1 is a flow chart in accordance with the invention.

A flow chart in accordance with the invention is presented in FIG. 1. As indicated, in the first step A of the process a mixture is formed of silicon tetrafluoride and water vapor. The mixture can be provided in a wide variety of ways, for example, by a suitably dehydrated or concentrated fluosilicic acid by-product of conventional phosphoric acid plants.

In the next step B of the process the silicon tetrafluoride of the mixture is flame hydrolysed to convert it to silicon dioxide and hydrogen fluoride. The flame hydrolysis is adjusted for substantially complete conversion and the production of relatively large particles of silicon dioxide having approximate diameters in excess of 100 millimicrons and advantageously in excess of 200 millimicrons. Complete conversion is needed to avoid contamination by silicon tetrafluoride. The large particles are desired because they reduce the amount of silica surface which is accessible to, and therefore reconvertible to silicon tetrafluoride, by the coexisting hydrogen fluoride. In addition the comparatively large size of the silicon dioxide particles facilitates their separation from the hydrogen fluoride. In general, the particles of silicon dioxide are so large that they would not be of commercial grade. The degree of conversion is influenced by the reaction temperature and the amount of moisture present, which must be in excess of the stochiometric amount. As the amount of moisture decreases, the temperature for substantially complete conversion increases.

In order to prevent the kind of reverse reaction of the silicon dioxide with hydrogen fluoride that has characterized the prior art, e.g. U.S. Pat. Nos. 3,203,759; 3,087,787 and 2,631,063, and has prevented the direct realization of high purity hydrogen fluoride, in the third step of the invention, the reaction products from the flame hydrolysis are deliberately cooled and the silicon dioxide particles are agglomerated. The cooling promotes the desired agglomeration, by which the particles become clustered together. This significantly reduces the silica surface that is accessible to the hydrogen fluoride. In accordance with the invention, and contrary to the equilibrium data and other indications of the prior art, the cooling and agglomeration of large size particles of silicon dioxide can take place at relatively low temperatures, indeed as low as 400° F (204° C), which according to the prior art would not produce a satisfactory result even for impure hydrogen fluoride used as intermediate product.

Following the third step C, the relatively large mass silica agglomerates are completely separated from the hydrogen fluoride in the fourth step D, and substantially pure hydrogen fluoride is recovered in the fifth and final step E, in which further processing takes place according to the level of moisture desired in the final product.

Figure 2:
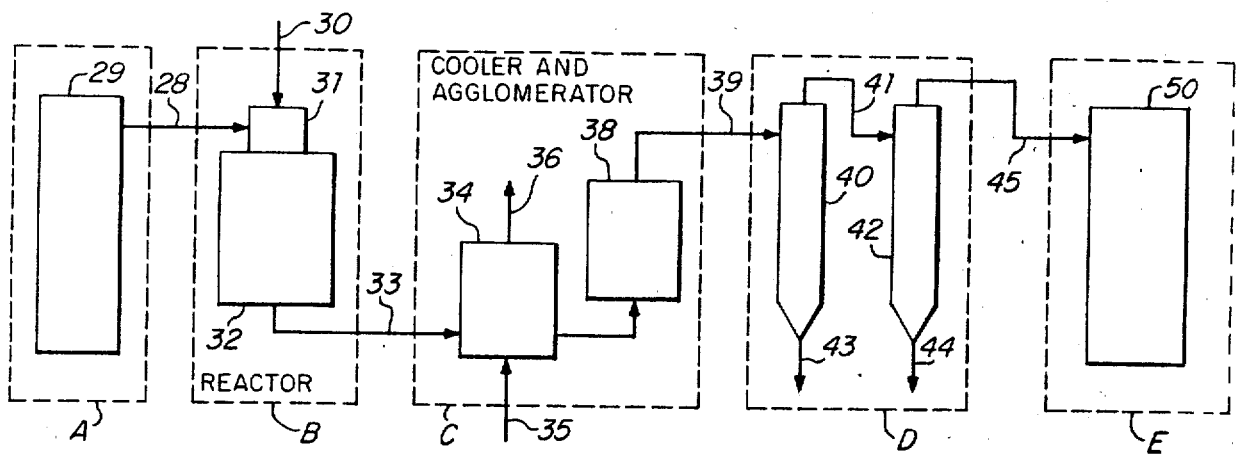
FIG. 2 is a block diagram of apparatus for practicing the invention.

A block diagram of apparatus for the direct production of high grade hydrogen fluoride according to the invention is shown in FIG. 2. A feed stream of silicon tetrafluoride and moisture is produced in a mixture formation section A at the input unit 29, which may take the form of concentrators for fluosilicic acid recovered from phosphoric acid concentrators.

From the mixture formation section A, a line 28 carries the feed stream to a burner 31 of a flame hydrolysis section B. Fuel gas, which may be natural gas, propane, carbon monoxide, hydrogen, vaporized light oil, or any other low sulfur fuel which can be vaporized, is introduced through a line 30 to the burner 31.

In a reactor 32, of the flame hydrolysis section B, the feed gas containing silicon tetrafluoride reacts with water present in the feed stream and that produced by combustion of the hydrogen in the fuel. Silicon dioxide is precipitated in particles, of a size dependent on the concentration of the silicon tetrafluoride in the gas mixture and the degree of mixing prior to entering the combustion zone. A high degree of conversion of the silicon tetrafluoride occurs over a wide range of concentration when the water available in the reaction zone is at least twice the stochiometric requirement for hydrolysis. The flame temperature is preferably 2000° F or higher. A gaseous stream containing hydrogen fluoride with suspended silicon dioxide particles leaves the reactor 32 over a line 33 to a cooling agglomeration section C.

In the cooling section C, the first unit is a gas cooling exchanger 34, which is preferably an air cooled tubular unit in which the process gases pass through nickel tubes at a velocity of at least 30 feet per second. This exchanger cools the gases to approximately 1200° F. Air enters the exchanger through line 35 and exits through line 36. Gases from the cooler 34 then flow through a line 37 to a silic agglomerator 38.

From the section C the output goes to a separator section D over a line 39 and enters a first stage 40 of cyclone separators. The preferred silica separation system has two stages of small diameter cyclones, which are more efficient for the intended purpose. The gas stream leaves the first cyclone stage through a line 41 and enters a second cyclone stage 42. Silica is removed through rotary valves or other gastight devices through lines 43 and 44. Approximately 85% of the silica recovered in this section passes through line 43 and 15% through line 44.

The gases leave the silica separation equipment through line 45 and flow to the hydrogen fluoride recovery section E, where excess moisture is removed from the product, for example, by a sulfuric acid concentrator 50.

A block diagram for alternative apparatus 100 is shown in FIG. 3. A hydrolysis reactor 110 in a section B is supplied with a feed stream, like that for FIG. 2, at an inlet 111. Fuel gases are applied to a fuel spud 112 and ignited at circumferential apertures near the capped end 112c, while air is applied through a nozzle 113 and forced through a helical air jacket sheel 114 to an inlet 115 where mixing takes place with the feed stream. The mixture of air and feed is then injected within the flame envelope F in the refractory zone 116, which has tapered walls 116t-1 and 116t-2. The fuel spud 112 and the zone 116 are designed to produce a flame F with a small amount of turbulence since this reduces the amount of mechanical mixing and promotes large particle size. The taper of the side walls 116t-1 and 116t-2 in the refractory zone 116 also contributes to this effect, and provides a stable high temperature flame by which the desired conversion can be made to take place rapidly. The spiraling of the air input by the helical sheel 114 achieves suitable preheating by the time the air reaches the inlet 115, and promotes the desired combustion. In a representative reactor 110 the conversion zone had a length L1 of 3 feet and the output zone had a length L3 of 12 feet. The outside diameter of the reactor 110 was 2 feet 4 inches and the inside diameter was 2 feet. In the refractory zone 116 the dimensions ranged from a width of about 0.5 feet at the beginning of the taper to about 1.0 feet at the end of the taper.

From the outlet 117 of the reactor 110, the silicon dioxide and hydrogen fluoride reaction products pass to a cooler 211 of a cooler-agglomerator 210 in a section C. Cooling is achieved with a fan 212 in an air duct 213. It is also possible to cool the reaction products by quenching with water sprays, but this dilutes the resulting hydrogen fluoride so that additional output dehydration is required. A suitable cooler 211 has light gauge fin tubes.

The second component of the cooler-agglomerator 210 is an electrolatic precipator 213, which is operated with its collection hoppers 214a and 214b empty in order to prevent collected silica from insulating the bottom from the gas stream. About a third of the silica is recovered in the precipatator 213 and removed at the hoppers 214a and 214b through rotary star valves which provide a suitable seal. The effect of the precipitator 213 is to cause the silica particles to cluster and thus significantly reduce the access of the hydrogen fluoride to the silica surfaces. The agglomerative effect of the precipitator 213 is promoted by the cooling achieved with the cooler 211.

As a result, there is substantially no reconversion of the hydrogen fluoride to silicon tetrafluoride, at the preferred recovery temperature of 1100° F (593° C), and lower. This is by contrast with the prior art of Flemmert U.S. Pat. No. 3,205,759 and Engelson U.S. Pat. No. 2,631,083 which indicate that low temperatures are completely unacceptable for substantial recovery of the conversion product. Thus Engelson U.S. Pat. No. 2,631,083 indicates that at 1100° F (593° C) the conversion is on the order of 50%, while in accordance with the invention the recovery at 1100° F (593° F) is at least 95% and can be as high as 99+%. These percentages express the degree of recoverable hydrogen fluoride in terms of the total hydrogen fluoride and inevitable silicon tetrafluoride amount.

The principal recovery of the silica, substantially the remaining two-thirds, takes place in the separation section D which contains two stages of small diameter cyclones in banks (multicyclones or similar). Like the precipitator 213, these units also have collection hoppers which are kept empty by removing the silica product through star valves as soon as it is collected.

Following the cyclones, commercial grade hydrogen fluoride, i.e., that in which the silicon tetrafluoride contamination is considerably less than five per cent, is achieved in any convenient way, for example by using the hydrogen fluoride condenser-absorber, followed by concentrators and distillation columns as needed.

Figure 4:
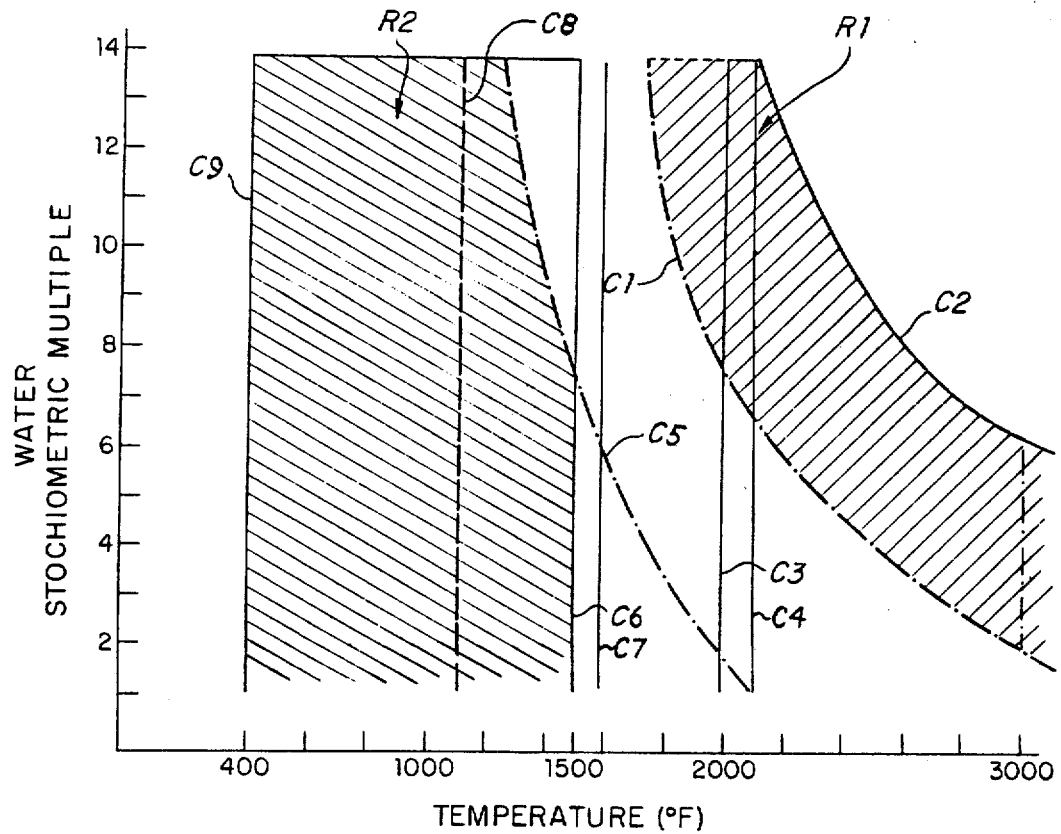
FIG. 4 is a graph illustrating the invention.

A number of the conditions applicable to the invention are set forth in FIG. 4.

Moisture must be present in excess of the stochiometric requirement for the conversion of silicon tetrafluoride to hydrogen fluoride and silica. The desired range is from 2 to 14 times the stochiometric amount, although any range above the stochiometric amount may be used. For these values the preferred hydrolysis temperatures range from about 3000° F (1649° C) for a stochiometric multiple of two to about 1800° F (982° C) for a stochiometric multiple of 14, as shown by curve C1. While satisfactory results can be obtained from temperatures higher and lower than those of curve C1, there is no advantage to going beyond curve C2 since there is a considerable increase in operating expense (because of the fuel costs). Similarly the lower operating cutoff is curve C3 (at 2000° F or 1093° C) because of difficulties in maintaining the proper hydrolysis conditions. To assure maintenance of proper hydrolysis conditions, it is desirable to operate above 2100° F (curve C8).

Once the hydrolysis has taken place, the reaction products are cooled by at least 500° F (260° C). For the operating temperatures of curve C1 the result is the range of collection temperatures given by curve C5, which extends from 2000° F (1093° C) for a stochiometric multiple of two to 1300° F (704 ° C) for a stochiometric number of 14. It will be understood that as the operating range for hydrolysis is made higher or lower, the collection temperature range is shifted correspondingly. However, since as noted above, the lower operating limit is 2000° F (1093° C), the corresponding collection temperature is 1500° F (816° F) as shown by curve C6; while for a lower operating limit of 2100° F the collection temperature is 1600° F as shown by curve C7.

In any event, however, the preferred collection temperature is below 1100° F (593° C) as shown by curve C8, although the collection temperature can be reduced as low as 400° (204° C) as shown by curve C9. In general, for hydrolysis in accordance with region R1, the collection temperature is in the region R2.

The invention is further illustrated by the following nonlimiting examples:

Example I

Using the apparatus system of FIG. 2, a reactor feed for line 28 is produced by vaporizing 26,257 lbs./hr. of fluosilicic acid with 34,560 lbs./hr. of air in the input unit 29. In the burner 31, 2,000 lbs./hr. of methane is applied to the line 30 and mixed with the feed stream as it enters the reaction chamber 32. Combustion and hydrolysis take place in the chamber 32 at a temperature of approximately 2,000° F (1093° C). The amount of water present is approximately 11.6 times the stochiometric amount. The particles size of silica formed in the chamber 32 is affected by the degree of mixing of fuel gas with the reactants at the burner nozzle. When using a burner similar to that shown in FIG. 3, control is exercised by adjusting the axial position of the gas inlet spud.

The reactor effluent is cooled in unit 34 and the silica agglomerated in an electrostatic precipitator 38, followed by collection in cyclines 40 and 42 at a temperature of 1300° F (704° C). The various yields and losses experienced in this illustrative operation are set forth in Table I.

Table I

| Components | Quantities are in Lbs./Hr. | | | | |
|---|---|---|---|---|---|
| | Reactor Feed | Fuel | Reactor Effluent | Vent Gases | Product |
| $H_2O$ | 18,380 | — | 20,911 | 3,643 | — |
| HF | 2,188 | — | 6,564 | 14 | 6,235 |
| $SiF_4$ | 5,689 | — | — | — | — |
| $SiO_2$ | — | — | 3,282 | — | — |
| $CH_4$ | — | 2,000 | — | — | — |
| $CO_2$ | — | — | 5,500 | 5,500 | — |
| $O_2$ | 8,000 | — | — | — | — |
| $N_2$ | 26,560 | — | 26,560 | 26,560 | — |
| | 60,817 | 2,000 | 62,817 | 35,717 | 6,235 |

About 95% of fluorine in the feed to this process is converted to hydrogen fluoride. The remainder is lost with vent gases, with the removed silica, through leakage and with the sulfuric acid used for dehydration. In all other processes for the production of HF from fluosilicic acid, it is possible to recover a maximum of 33% of the fluorine present in each processing cycle. This necessitates a large amount of recycling, which adds substantially to the production cost.

Air is adjusted as near as possible to the stochiometric combustion requirement. The efficiency of the hydrogen fluoride production by this example is apparent from the rates of usage of the principal materials. The fuel requirement per ton of produced hydrogen fluoride is 15,100,000 BTU.

Water is removed by means of a dehydrating agent, such as sulfuric acid or polyethylene glycol at the rate of 2.0 tons per ton of produced hydrogen fluoride.

If 98% sulfuric acid is used for dehydration of hydrogen fluoride and withdrawn from the system at 75% concentration (which is suitable for phosphate rock processing), 6.5 tons of 98% sulfuric acid is required per ton of produced hydrogen fluoride.

EXAMPLE II

Example I is repeated in the system of FIG. 3, which requires that air be applied at the inlet 113 of the reactor 110. The collection of the silica takes place at a temperature of 1000° F (538° C). The output product is 99+% hydrogen fluoride and the fuel consumption is 14.9 million BTU per ton of produced hydrogen fluoride.

EXAMPLE III

Example II is repeated, except that the ratio of available to stochiometric water is 2.0, as achieved by the partial dehydration of fluosilicic acid. The reaction temperature is 2500° F (1371° C) and the fuel consumption is 8.2 million BTU per ton of 99+% hydrogen fluoride produced.

EXAMPLE IV

Example III is repeated, except the feed is completely dehydrated and superheated steam at 1000° F (538° C) is added at the reactor 110 to supplement the water obtained by the combustion of methane. The fuel consumption is 6.4 million BTU per ton of 99+% hydrogen fluoride.

EXAMPLE V

Example III is repeated, except that oxygen is used in place of air. The fuel consumption is 4.8 million BTU per ton of 99+% hydrogen fluoride.

EXAMPLE VI

Example II is repeated, except that the reactor temperature is 2,500° F (1371° C) and the ratio of available to stochiometric water is 13.3. The fuel consumption is 25.7 BTU per ton of 99+% hydrogen fluoride.

EXAMPLE VII

Example III is repeated, except that the reactor temperature is 2000° F (1093° C). The fuel consumption is 5.5 million BTU per ton of 99+% hydrogen fluoride.

EXAMPLE VIII

Example III is repeated, except that the ratio of available to stochiometric water is 4.0. The fuel consumption is 11.3 million BTU per ton of 99+% hydrogen fluoride.

EXAMPLE IX

Example III is repeated, except that the reaction temperature is 2800° F (1538° C). The fuel consumption is 10.5 million BTU per ton of 99+% hydrogen fluoride.

EXAMPLE X

Example IX is repeated, except that the ratio of available to stochiometric water is 5.0. The fuel consumption is 16.8 million BTU per ton of 99+% hydrogen fluoride.

EXAMPLE XI

Example II is repeated, except that the reactor temperature is 3000° F (1649° C) and the ratio of available to stochiometric water is 11.6. The fuel consumption is 51.6 million BTU per ton of 99+% hydrogen fluoride.

While various aspects of the invention have been illustrated by the foregoing detailed embodiments, it will be understood that various substitutions of equivalents may be made without departing from the spirit and scope of the invention as set forth in the appended claims:

What is claimed is:
1. The method of producing commercial grade hydrogen fluoride comprising the steps of
   a. forming a mixture of silicon tetrafluoride and water vapor;
   b. flame hydrolysing the silicon tetrafluoride at a temperature in the range from about 2100° F to above about 3000° F with a ratio of available water to stochiometric water for flame hydrolysis in the range from above about 1:1 to about 14:1 to convert at least 95% of the silicon tetrafluoride to hydrogen fluoride and silicon dioxide particles with diameters in excess of about 100 millimicrons;
   c. cooling the reaction products of the flame hydrolysis by more than 500° F with negligible dilution;
   d. agglomerating the silicon dioxide particles and removing them from the reaction products; and
   e. recovering hydrogen fluoride with a purity in excess of 95%.

2. The method of claim 1 wherein the reaction products are cooled to within the range from about 400° to about 1500° F.

3. The method of claim 1 wherein the reaction products are cooled to below 1100° F.

4. The method of claim 1 wherein the flame hydrolysis temperature is in the range from about 2200° to about 2900° F.

5. The method of claim 1 wherein the flame hydrolysis temperature is in the range from about 2200° to about 2600° F.

6. The method of claim 1 wherein the ratio of the available water to the stochiometric water for the flame hydrolysis is in the ratio from about 2:1 to about 7:1.

7. The method of claim 1 wherein the ratio of the available water to the stochiometric water is about 3.

8. The method of claim 1 wherein the mixture of silicon tetrafluorine and water vapor is formed from distilled or dehydrated fluosilicic acid.

9. The method of claim 1 wherein the hydrogen fluoride is recovered by concentration.

10. The method of producing commercial grade hydrogen fluoride comprising the steps of
    a. forming a mixture of silicon tetrafluoride and water vapor;
    b. flame hydrolysing the silicon tetrafluoride at a temperature in the range from about 1800° F to about 3000° F with a ratio of available water to stochiometric water for flame hydrolysis in the range from about 2:1 to about 14:1 to convert at least 95% of the silicon tetrafluoride to hydrogen fluoride and silicon dioxide particles with diameters in excess of about 100 millimicrons;
    c. cooling the reaction products of the flame hydrolysis to a temperature within the range from about 400° F to about 1500° F with negligible dilution
    d. agglomerating the silicon dioxide particles and removing them from the reaction products; and
    e. recovering hydrogen fluoride with a purity in excess of 95%.

11. The method of producing commercial grade hydrogen fluoride comprising the steps of
    a. forming a mixture of silicon tetrafluoride and water vapor;
    b. flame hydrolysing the silicon tetrafluoride at a temperature in the range from about 2000° F to about 3000° F with a ratio of available water to stochiometric water for flame hydrolysis in the range from about 2:1 to about 14:1 to convert at least 95% of the silicon tetrafluoride to hydrogen fluoride and silicon dioxide particles with diameters in excess of about 100 millimicrons;
    c. cooling the reaction products of the flame hydrolysis to a temperature within the range from about 400° F to about 1500° F with negligible dilution, and without allowing the conversion rate to fall below 95%;
    d. agglomerating the silicon dioxide particles and removing them from the reaction products; and
    e. recovering hydrogen fluoride with a purity in excess of 95%.

12. The method of producing commercial grade hydrogen fluoride comprising the steps of
    a. forming a mixture of silicon tetrafluoride and water vapor;
    b. flame hydrolysing the silicon tetrafluoride at a temperature in the range from about 2000° F and above, with a ratio of available water to stochiometric water for flame hydrolysis in the range from about 2:1 and above, to convert at least 95% of the silicon tetrafluoride to hydrogen fluoride and silicon dioxide particles with approximate diameters in excess of about 100 millimicrons;
    c. cooling the reaction products of the flame hydrolysis to below 1500° F with negligible dilution;
    d. agglomerating the silicon dioxide particles and removing them from the reaction products; and
    e. recovering the hydrogen fluoride with a purity in excess of 95%.

13. The method of producing commercial grade hydrogen fluoride comprising the steps of
    a. forming a mixture of silicon tetrafluoride and water vapor;
    b. flame hydrolysing the silicon tetrafluoride at a temperature in the range from about 1800° F to about 3000° F with a ratio of available water to stochiometric water in the range from about 2:1 to about 14:1 to convert at least 99% of the silicon tetrafluoride to hydrogen fluoride and silicon dioxide particles with approximate diameters in excess of about 200 millimicrons;
    c. cooling the reaction products of the flame hydrolysis by more than 500° F with negligible dilution;
    d. agglomerating the silicon dioxide particles and removing them from the reaction products; and
    e. recovering hydrogen fluoride with a purity in excess of 99%.

* * * * *